(12) United States Patent
Murakami et al.

(10) Patent No.: US 12,496,945 B2
(45) Date of Patent: Dec. 16, 2025

(54) SEAT HEATER AND SEAT AIR-CONDITIONING DEVICE

(71) Applicant: DENSO CORPORATION, Kariya (JP)

(72) Inventors: Hironobu Murakami, Kariya (JP); Shuji Ito, Kariya (JP); Naoto Goto, Kariya (JP)

(73) Assignee: DENSO CORPORATION, Aichi-pref. (JP)

( * ) Notice: Subject to any disclaimer, the term of this patent is extended or adjusted under 35 U.S.C. 154(b) by 226 days.

(21) Appl. No.: 18/509,759

(22) Filed: Nov. 15, 2023

(65) Prior Publication Data
US 2024/0083314 A1 Mar. 14, 2024

Related U.S. Application Data

(63) Continuation of application No. PCT/JP2022/015896, filed on Mar. 30, 2022.

(30) Foreign Application Priority Data

May 19, 2021 (JP) .................................. 2021-084798
Jan. 27, 2022 (JP) .................................. 2022-011074

(51) Int. Cl.
*B60N 2/68* (2006.01)
*B60N 2/56* (2006.01)

(52) U.S. Cl.
CPC ......... *B60N 2/5657* (2013.01); *B60N 2/5685* (2013.01)

(58) Field of Classification Search
CPC .... B60N 2/5657; B60N 2/5664; B60N 2/002; B60N 2/5642; B60N 2210/40; B60N 2/56
See application file for complete search history.

(56) References Cited

U.S. PATENT DOCUMENTS

| | | | |
|---|---|---|---|
| 6,929,322 B2* | 8/2005 | Aoki | B60H 1/00285 297/180.13 |
| 7,053,344 B1 | 5/2006 | Surjan et al. | |
| 7,918,498 B2* | 4/2011 | Bajic | B60N 2/5664 297/180.12 |
| 8,408,641 B2* | 4/2013 | Lem | B60N 2/5664 297/180.13 |
| 10,118,520 B2* | 11/2018 | Craig | B60N 2/5635 |
| 10,974,629 B2* | 4/2021 | Wolf | B60N 2/5657 |
| 11,571,997 B2* | 2/2023 | Baranowski | B60N 2/5642 |
| 2003/0102296 A1 | 6/2003 | Nelson et al. | |

(Continued)

FOREIGN PATENT DOCUMENTS

| | | |
|---|---|---|
| JP | 2003297532 A | 10/2003 |
| JP | 2006019286 A | 1/2006 |

(Continued)

*Primary Examiner* — Shin H Kim
(74) *Attorney, Agent, or Firm* — Harness, Dickey & Pierce, P.L.C.

(57) ABSTRACT

A seat heater is installed between a seat pad that is a member supporting a load from a seated person sitting on a seat and has a plurality of ventilation holes through which the air generated by a blower flows is formed on a surface on a side of the seated person and a covering that covers a surface of the seat pad and has breathability. The seat heater includes a thin plate-like base material having voids through which air passes, and a heating wire fixed to the base material. A plurality of slits separate from the voids are formed in the base material.

11 Claims, 11 Drawing Sheets

(56) References Cited

U.S. PATENT DOCUMENTS

| | | | |
|---|---|---|---|
| 2003/0213797 A1 | 11/2003 | Yoneyama et al. | |
| 2004/0238516 A1 | 12/2004 | Bulgajewski | |
| 2007/0063551 A1* | 3/2007 | Gasic | B60N 2/5635 |
| | | | 297/180.1 |
| 2007/0246456 A1 | 10/2007 | Yoneyama et al. | |
| 2009/0284052 A1* | 11/2009 | Bajic | A47C 7/744 |
| | | | 297/180.1 |
| 2016/0236598 A1 | 8/2016 | Hoshi | |
| 2017/0361743 A1 | 12/2017 | Hoshi | |
| 2018/0361894 A1* | 12/2018 | Wolf | B60N 2/5657 |

FOREIGN PATENT DOCUMENTS

| | | |
|---|---|---|
| JP | 2009125536 A | 6/2009 |
| JP | 2015074375 A | 4/2015 |

* cited by examiner

US 12,496,945 B2

SEAT HEATER AND SEAT AIR-CONDITIONING DEVICE

CROSS REFERENCE TO RELATED APPLICATIONS

This application is a continuation application of International Patent Application No. PCT/JP2022/015896 filed on Mar. 30, 2022, which designated the U.S. and based on and claims the benefits of priority of Japanese Patent Application No. 2021-084798 filed on May 19, 2021 and Japanese Patent Application No. 2022-011074 filed on Jan. 27, 2022. The entire disclosure of all of the above applications is incorporated herein by reference.

TECHNICAL FIELD

The present disclosure relates to a seat heater and a seat air-conditioning device.

BACKGROUND

A seat heater is used in a seat air-conditioning device. The seat air-conditioning device includes a seat having a seat pad and a covering, and a blower.

SUMMARY

An object of the present disclosure is to provide a seat heater and a seat air-conditioning device that can reduce the ventilation resistance of the seat heater, increase the degree of freedom in wiring of the heating wire, and eliminate the need for press work for providing a plurality of ventilation holes in the base material in manufacturing the seat heater, thereby simplifying a manufacturing process of the seat heater.

To achieve the above objective, according to one aspect of the present disclosure, a seat heater is installed between a seat pad that is a member supporting a load from a seated person sitting on a seat and has a plurality of ventilation holes through which the air generated by a blower flows being formed on a surface on a side of the seated person and a covering that covers a surface of the seat pad and has breathability. The seat heater includes a thin plate-like base material having air-permeable voids and a heating wire fixed to the base material. A plurality of slits separate from the voids are formed in the base material.

According to another aspect, a seat air-conditioning device includes a blower for generating air, a seat pad that is a member constituting a seat and supporting a load from a seated person sitting on a seat and has a plurality of ventilation holes through which the air generated by a blower flows being formed on a surface on a side of the seated person, a covering that constitutes the seat and covers the surface of the seat pad and has breathability, and a thin plate-shaped seat heater installed between the seat pad and the covering. The seat heater has a thin plate-like base material having a void through which air passes and a heating wire fixed to the base material, and a plurality of slits separate from the voids are formed in the base material.

DETAILED DESCRIPTION

Figure 1:
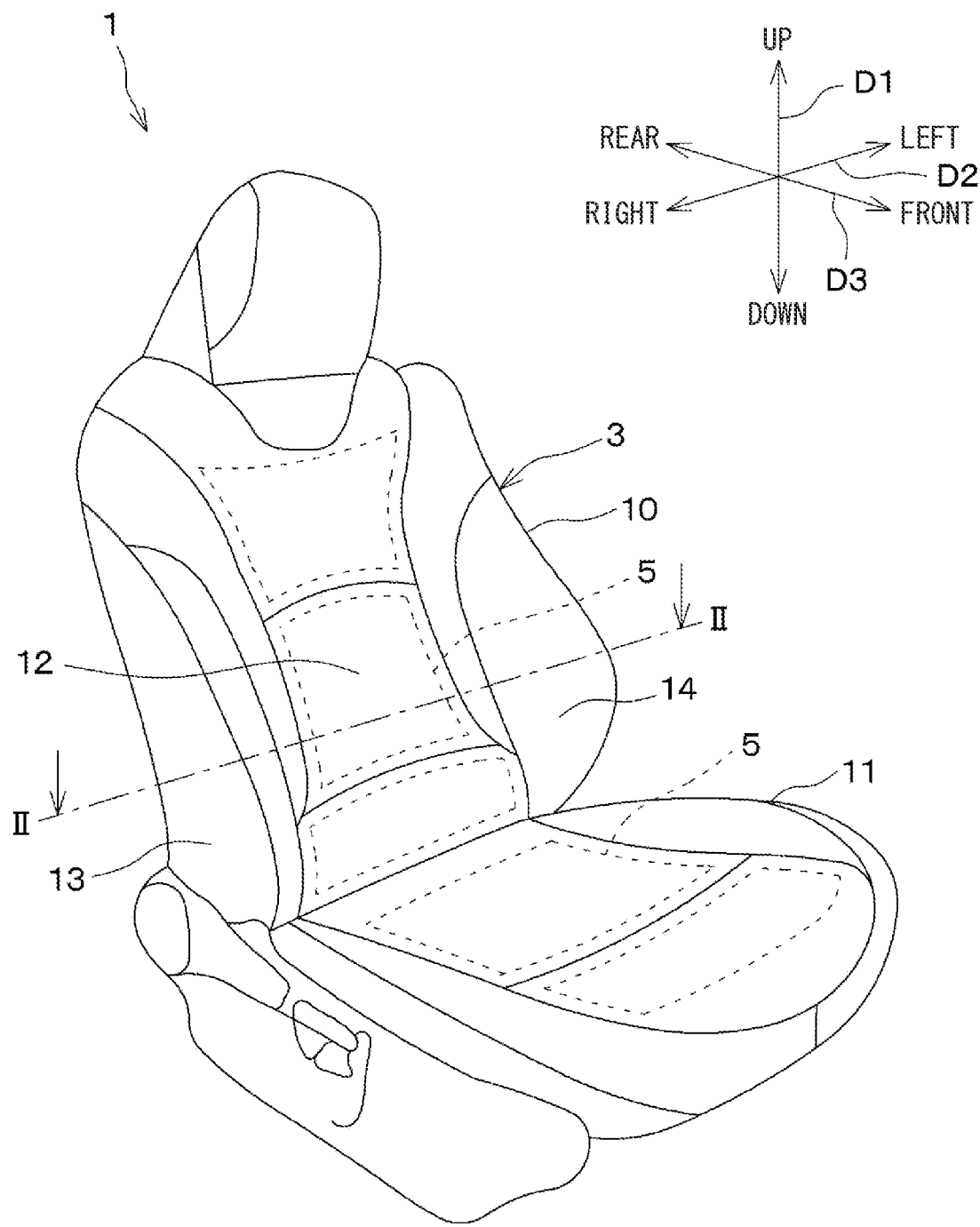
FIG. 1 is a perspective view of a vehicle seat air-conditioning device of a first embodiment.

In an assumable example, a seat heater is used in a seat air-conditioning device. The seat air-conditioning device includes a seat having a seat pad and a covering, and a blower. The seat pad is formed with a plurality of ventilation holes for passing the air generated by the operation of the blower. The covering has air permeability. The seat air-conditioning device draws in or blows out air through a plurality of ventilation holes by operating the blower, thereby improving the comfort of a passenger seated in the seat.

The seat heater includes a sheet-like base material such as a non-woven fabric having air gaps through which air passes, and a heating wire fixed to the base material. The seat heater is arranged between the seat pad and the covering. If the airflow resistance of the seat heater is large, the air flow through the plurality of ventilation holes of the seat pad is obstructed. Therefore, in the seat heater, a plurality of ventilation holes are formed in the base material in addition to the voids of the base material in order to reduce the ventilation resistance of the seat heater. A plurality of ventilation holes are formed by press working.

In the seat heater described above, the heating wire is fixed to the base material in which the plurality of ventilation holes are formed. In order to reduce the ventilation resistance of the seat heater, it is necessary to set a diameter of the ventilation hole to 10 mm or more. In this case, the heating wire cannot be fixed at the positions of the plurality of ventilation holes. For this reason, the heating wire must be arranged avoiding the plurality of ventilation holes, and the degree of freedom in layout of the heating wire is low. Since the heating wires are arranged so as to avoid the plurality of ventilation holes, there is a problem that the parts of the seated person that are desired to be warmed cannot be heated.

Further, a general method for manufacturing a seat heater includes a cutting step of cutting a roll-wound base material into an outer shape of the seat heater using a cutting machine. Therefore, in the method of manufacturing a seat heater according to the above-described conventional technology, a pressing process is required to form a plurality of ventilation holes in the base material by press working, in addition to the cutting process of the base material. In order to reduce manufacturing costs, fewer steps are desirable.

An object of the present disclosure is to provide a seat heater and a seat air-conditioning device that can reduce the ventilation resistance of the seat heater, increase the degree of freedom in wiring of the heating wire, and eliminate the need for press work for providing a plurality of ventilation holes in the base material in manufacturing the seat heater, thereby simplifying a manufacturing process of the seat heater.

To achieve the above objective, according to one aspect of the present disclosure, a seat heater is installed between a seat pad that is a member supporting a load from a seated person sitting on a seat and having a plurality of ventilation holes through which the air generated by a blower flows being formed on a surface on a side of the seated person and a covering that covers the surface of the seat pad and has breathability. The seat heater includes a thin plate-like base material having air-permeable voids, and a heating wire fixed to the base material. A plurality of slits separate from the voids are formed in the base material.

According to another aspect, a seat air-conditioning device includes a blower for generating air, a seat pad that is a member constituting a seat and supporting a load from a seated person sitting on a seat and has a plurality of ventilation holes through which the air generated by a blower flows being formed on a surface on a side of the seated person, a covering that constitutes the seat and covers a surface of the seat pad and has breathability, and a thin plate-shaped seat heater installed between the seat pad and the covering. The seat heater has a thin plate-like base material having a void through which air passes and a heating wire fixed to the base material, and a plurality of slits separate from the voids are formed in the base material.

According to these configurations, a plurality of slits are formed in the base material of the seat heater. Therefore, when the seated person sits on the seat or the seating posture of the seated person changes, a seating pressure is applied to a part of the base material, and the base material is deformed so as to expand. At least one of the plurality of slits is thereby opened. As a result, a ventilation resistance of the seat heater is reduced.

Moreover, according to these configurations, the plurality of slits are closed in a state in which no force is applied to the base material to spread the base material. Therefore, when the seat heater is manufactured, the heating wire can be fixed to the base material even if the heating wire is arranged over the plurality of slits. Even if the heating wire is arranged over one slit and one slit is divided into a plurality of slits, those slits can be opened. Therefore, it is not necessary to arrange the heating wire on the base material by avoiding a plurality of slits. Therefore, according to this seat heater, a degree of freedom in wiring of the heating wire is high, and the heating wire can be arranged so as to heat the part of the seated person desired to be warmed.

Further, according to these configurations, the formation of a plurality of slits is possible by cutting the base material. Therefore, it is possible to form a plurality of slits in the cutting step of cutting the base material wound into a roll into an outer shape of the seat heater. Therefore, it is possible to eliminate the need for the press process that is required when manufacturing the conventional seat heater described above. The manufacturing process of the seat heater can be simplified as compared with the manufacturing method of the conventional seat heater.

Hereinafter, embodiments of the present disclosure will be described with reference to the drawings. In the following embodiments, the same reference numerals are assigned to parts that are the same or equivalent to each other to describe the same.

First Embodiment

Figure 2:
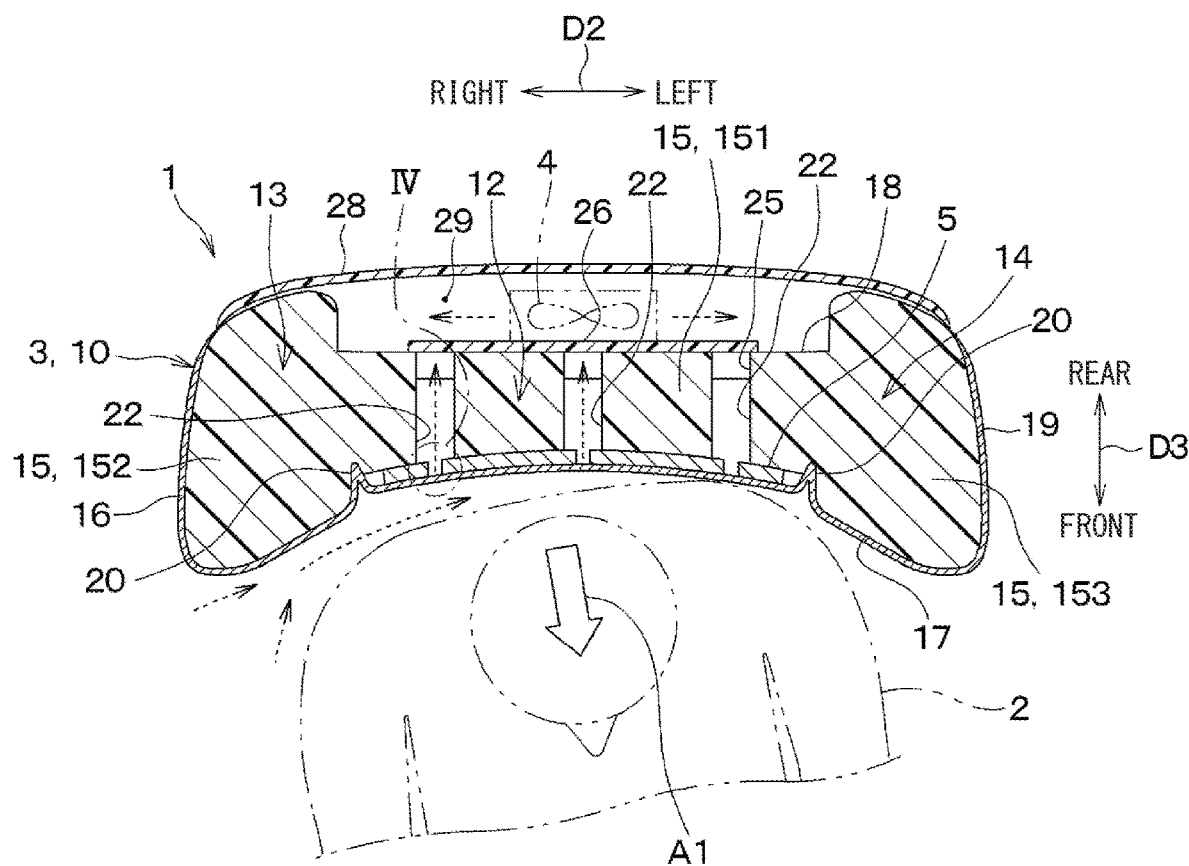
FIG. 2 is a cross-sectional view taken along a line II-II in FIG. 1.

A vehicle seat air-conditioning device using the seat heater of the present disclosure will be described. As shown in FIGS. 1 and 2, a vehicle seat air-conditioning device 1 includes a seat 3 on which a passenger 2 is seated, a blower 4 that forms an airflow, and a seat heater 5. In FIGS. 1 and 2, an up-down direction D1, a left-right direction (that is, lateral direction) D2, and a front-rear direction D3 indicate respective directions of the seat 3 when the seat 3 is installed in a vehicle interior. The up-down direction D1 of the seat 3 coincides with the up-down direction of the vehicle. The lateral direction D2 of the seat 3 coincides with the lateral direction of the vehicle. The front-rear direction D3 of the seat 3 coincides with the front-rear direction of the vehicle.

The seat 3 is applied to the vehicle seat air-conditioning device 1 and is a vehicle seat on which the passenger 2 sits. In the present embodiment, the passenger 2 is a person sitting on the seat 3. The seat 3 is installed inside the vehicle. The seat 3 includes a seat back 10 and a seat cushion 11. The seat back 10 supports the back of the passenger 2 seated on the seat 3. The up-down direction D1 of the seat back 10 when the seat back 10 is parallel to the up-down direction D1 is a longitudinal direction of the seat back 10. The seat cushion 11 supports the buttocks of the passenger 2 seated on the seat 3.

A seat heater 5 is installed on each of the seat back 10 and the seat cushion 11. The seat back 10 and the seat cushion 11 have different outer shapes, but have the same basic configuration. Similarly, the seat heater 5 installed on the seat back 10 and the seat heater 5 installed on the seat cushion 11 have different outer shapes, but have the same basic configuration. Therefore, the configuration of the seat back 10 and the configuration of the seat heater 5 installed in the seat back 10 will be described below.

The seat back 10 has a central portion 12 and a pair of side supports 13 and 14. The central portion 12 is a portion of the seat back 10 located on the center side in the lateral direction D2 of the seat back 10. The central portion 12 faces the back of the passenger 2 seated on the seat 3 in a thickness direction of the seat back 10 and supports the back of the passsenger 2 from behind. The central portion 12 is also called a backrest surface or a seat surface. The side supports 13 and 14 are portions of the seat back 10 located on both sides of the seat back 10 in the lateral direction D2 with respect to the central portion 12. The side supports 13 and 14 laterally support the back of the passenger 2 seated on the seat 3.

The seat back 10 has a seat pad 15 and a covering 16. The seat pad 15 is a member that supports the load of the seated passenger 2, that is, a cushion material. The seat pad 15 is made of a flexible foamed polyurethane resin molding. The seat pad 15 has functions such as maintaining the posture of the passenger 2, distributing body pressure, and suppressing vibration. In addition, in the present embodiment, the seat pad 15 is composed of one type of foamed polyurethane resin, but may be composed of two or more types of foamed polyurethane resin having different softnesses. Also, the seat pad 15 may be made of a foamed resin molding other than foamed polyurethane resin.

As shown in FIG. 2, the seat pad 15 has a front surface 17 that is the passenger side of the seat pad 15, a back surface 18 that is the surface opposite to the passenger side of the seat pad 15, and a side surface 19 that is the side surface of the seat pad. The covering 16 covers the surface 17 and the side surface 19 of the seat pad 15. The covering 16 is made of fabric, leather, or the like. The covering 16 has a plurality of fine holes (not shown) called perforations, and has air permeability. The diameter of one hole is, for example, about 1 mm.

The seat pad 15 has a central pad portion 151 and a pair of side pad portions 152 and 153. The central pad portion 151 constitutes the central portion 12 of the seat back 10. The central pad portion 151 is a portion of the seat pad 15 located on the center side of the seat back 10 in the lateral direction D2. The side pad portions 152 and 153 constitute side supports 13 and 14 of the seat back 10. The side pad portions 152 and 153 are portions of the seat pad 15 located on both sides of the seat back 10 with respect to the central pad portion 151 in the lateral direction D2.

A plurality of hanging grooves 20 are formed on the surface 17 of the seat pad 15. The plurality of hanging grooves 20 are grooves for hanging and supporting the covering 16. A plurality of hanging portions formed on the covering 16 are inserted into the respective hanging grooves 20 and fixed thereto.

A plurality of ventilation holes 22 are formed in the surface 17 of the central pad portion 151 of the seat pad 15. A plurality of ventilation holes 22 pass through the seat pad 15 from the front surface 17 to the back surface 18 of the seat pad 15. Wind generated by the operation of the blower 4 flows through the plurality of ventilation holes 22. In the surface 17 of seat pad 15, each of the ventilation holes 22 is substantially circular. The diameter of each ventilation hole 22 is, for example, 20 to 30 mm.

The seat heater 5 warms the seated passenger seated on the seat 3 by generating heat. The seat heater 5 is installed between the seat pad 15 and the covering 16. The seat heater 5 is arranged to face the central pad portion 151 in the thickness direction of the seat heater 5. In other words, the seat heater 5 covers the surface 17 of the central pad portion 151 and covers the plurality of ventilation holes 22.

Figure 3:
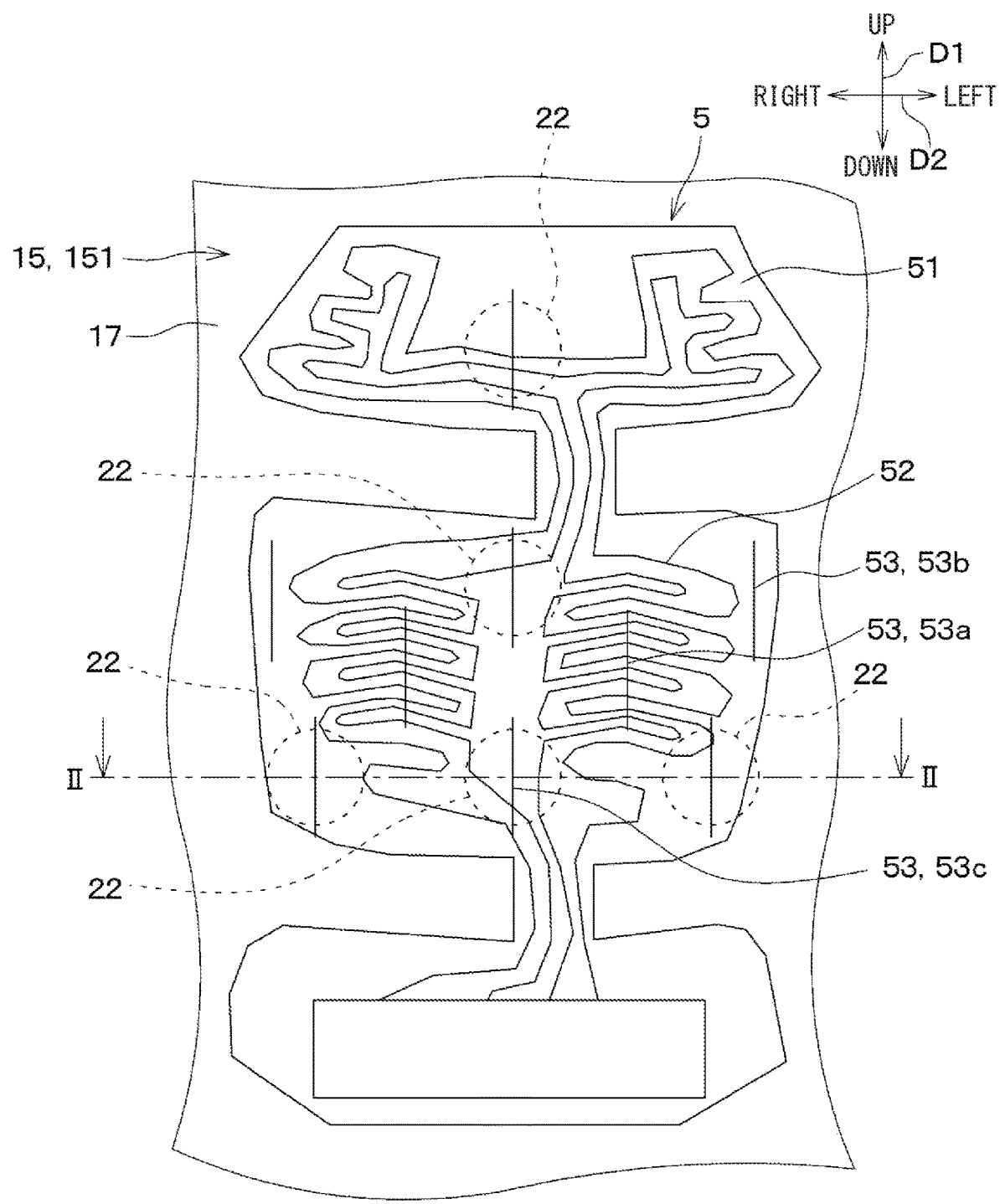
FIG. 3 is a front view of a seat heater and part of a seat pad of the first embodiment.

As shown in FIG. 3, the seat heater 5 includes a base material 51 and a heating wire 52. The base material 51 is sheet-like (that is, thin plate-like) and has a void through which air passes. As the base material 51, a non-woven fabric, a flexible foamed polyurethane resin, or the like is used. When a nonwoven fabric is used as the base material 51, the voids exist between the fibers. The heating wire 52 is a linear heating element that generates heat when energized. A copper alloy or the like is used as the heating wire 52. Depending on the wiring specifications of the heating wire 52, it is possible to provide a uniform temperature distribution or a temperature difference. The heating wire 52 is fixed to the base material 51 by thermal welding. The heating wire 52 may be fixed to the base material 51 by adhesion using an adhesive. Moreover, the heating wire 52 may be fixed to the base material 51 by sewing.

The seat heater 5 is fixed to the seat pad 15 by adhesion using double-sided tape. Alternatively, the seat heater 5 is fixed to the covering 16 with a tag pin. When a plate-like cushioning material called a slab is fixed to the back side of the covering 16, the seat heater 5 is fixed to a slab with a tag pin. Thus, the seat heater 5 may be fixed to the covering 16 via the slab.

As shown in FIG. 3, a plurality of slits 53 are formed in the base material 51 in addition to the voids of the base material 51 in order to reduce the ventilation resistance of the seat heater 5. Each slit 53 is a notch. In other words, each slit 53 is a linearly arranged gap. Each slit 53 is a gap of a size that cannot be visually confirmed when the base material 51 is not under tensile stress. Each of the plurality of slits 53 extends linearly in the vertical direction.

The plurality of slits 53 includes slits 53a arranged in the base material 51 at positions facing a portion of the heating wire 52 in the thickness direction of the base material 51. The slits 53a are arranged to extend linearly so as to intersect with the heating wire 52 projected onto the base material 51 in the thickness direction thereof. The plurality of slits 53 includes slits 53b arranged in the base material 51 at positions not facing the heating wires 52 in the thickness direction of the base material 51. The slit 53b is arranged at a position of the base material 51 where the heating wire 52 is not arranged.

The plurality of slits 53 includes a slit 53c arranged at a position facing any one of the plurality of ventilation holes 22 in the thickness direction of the base material 51 in the base material 51. The slit 53c is arranged at a position where the ventilation hole 22 is projected onto the base material 51 when the ventilation hole 22 is projected onto the base material 51 in the thickness direction of the base material 51. The slit 53c arranged at a position facing the ventilation hole 22 is arranged so as to straddle the ventilation hole 22.

A method of manufacturing the seat heater 5 includes a step of forming a base material. In this step, when the base material is a nonwoven fabric, the nonwoven fabric is formed by, for example, a needle punching method. The formed nonwoven fabric is wound into a roll.

The method of manufacturing the seat heater 5 includes a cutting step of cutting the base material 51 wound into a roll into the outer shape of the seat heater 5 by an NC cutting machine. In this cutting step, a plurality of slits 53 are formed by cutting the base material 51 with an NC cutting machine. Thus, since the formation of the plurality of slits 53 is not performed by punching, punching waste is not generated. For this reason, the method for manufacturing the seat heater 5 of this embodiment is an environment-friendly manufacturing method. At this time, the plurality of slits 53 are formed so that the plurality of slits 53 are positioned in the base material 51 at positions facing the plurality of ventilation holes 22 of the seat pad 15.

Furthermore, the method of manufacturing the seat heater 5 includes a fixing step of fixing the heating wire 52 by welding to the base material 51 cut into the outer shape of the seat heater 5 and having a plurality of slits 53 formed therein. Thereby, the seat heater 5 is manufactured.

As shown in FIG. 2, a back groove 25 is formed on the back surface 18 of the seat pad 15. The back groove 25 forms a ventilation path between the plurality of ventilation holes 22 and the blower 4. A back cover 26 is provided at a portion corresponding to the back groove 25 on a back surface 18 side of the seat pad 15. The back cover 26 is made of, for example, hard felt, polypropylene, resin such as POM, or the like. The back cover 26 is attached to the back surface 18 of the seat pad 15 so as to block an open surface of the back groove 25. The blower 4 is provided behind the back cover 26. Although not shown, the back cover 26 is provided with an opening hole at a position corresponding to an air suction port of the blower 4. A back frame 28 is provided behind the blower 4. An outer edge of the back frame 28 is connected to the seat pad 15. A seat back space 29 is formed between the back cover 26 and the back frame 28.

The blower 4 is arranged in the seat back space 29. The blower 4 is a fan that generates an airflow by rotating an impeller driven by an electric motor (not shown). A centrifugal fan is used as the impeller. An axial fan, a diagonal fan, or a turbo fan may be used as the impeller. The blower 4 is configured to blow the air sucked from the perforations of the covering 16 through the plurality of ventilation holes 22 and the back grooves 25 into the seat back space 29.

In the vehicle seat air-conditioning device 1 of this embodiment configured as described above, the blower 4 operates while the energization of the seat heater 5 is stopped during the cooling operation for cooling the passenger.

When the seated posture of the passenger 2 is a normal posture in which the passenger 2 faces forward and most of the back of the passenger 2 contacts the seat back 10, the plurality of ventilation holes 22 of the central pad portion 151 are blocked by the back. Therefore, no wind flows between the back of the passenger 2 and the seat back 10. Alternatively, less wind flows between the back of the passenger 2 and the seat back 10.

An arrow A1 in FIG. 2 indicates a direction in which the body of the passenger 2 is facing. As shown in FIG. 2, the seating posture of the passenger 2 changes from the normal posture to an oblique posture in which the passenger 2 faces diagonally forward. In the oblique posture, one side of the back of the passenger 2 in the left-right direction contacts the seat back 10, and the other side of the back in the left-right direction leaves the seat back 10. As a result, the air in the passenger compartment passes through the covering 16 and the seat heater 5 and is sucked in through the ventilation holes 22 that are not blocked by the back of the passenger 2, so that wind flows between the back of the passenger 2 and the seat back 10. At this time, the amount of wind flowing between the back of the passenger 2 and the seat back 10 is greater in the oblique posture than that in the normal posture.

Figure 4:
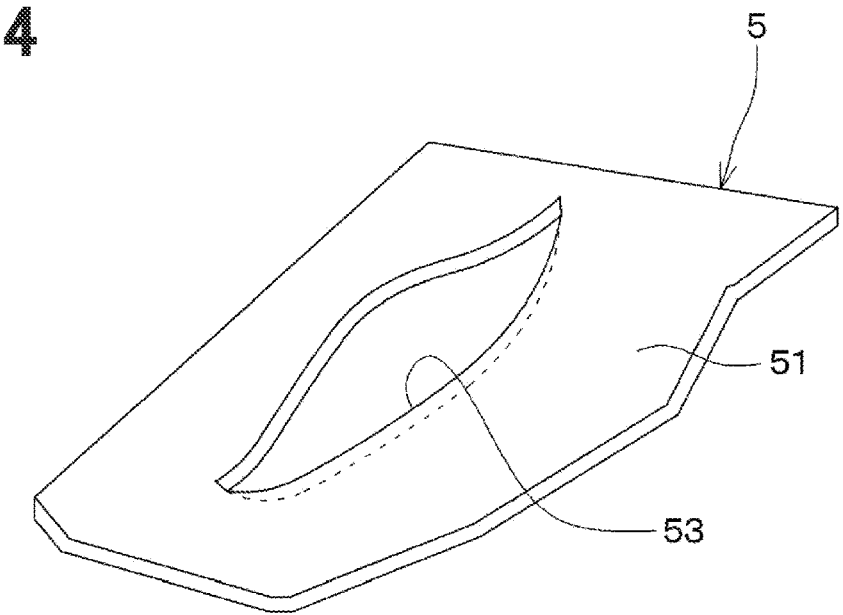
FIG. 4 is a view of the seat heater of the first embodiment of the IV section of FIG. 2 as seen from the passenger side, and is a perspective view of the slit in an opened state and its peripheral portion.

Next, the effect of the seat heater 5 of the present embodiment will be described. A plurality of slits 53 are formed in the base material 51 of the seat heater 5. Therefore, when the seating posture of the passenger 2 changes from the normal posture to the oblique posture, seating pressure is applied to a part of the base material 51, and the base material 51 is deformed so as to expand. Thereby, as shown in FIG. 4, at least one slit 53 among the plurality of slits 53 is opened. At least one open space is formed in the base material 51 by opening at least one slit 53. As a result, the ventilation resistance of the seat heater 5 is reduced.

In particular, in the present embodiment, as shown in FIG. 3, the plurality of slits 53 includes a slit 53c arranged at a position facing one ventilation hole 22 of the seat pad 15. For this reason, air currents that are sucked into the ventilation holes 22 are likely to occur. By arranging the slit 53 in the seat pad 15 at a position facing a passage through which the wind flows, the ventilation resistance of the seat heater 5 can be reduced.

The opening of the plurality of slits 53 is not limited to when the sitting posture changes from the normal posture to the oblique posture. When the passenger 2 is seated, a seating pressure is applied to at least a part of the base material 51, and the plurality of slits 53 are opened when the base material 51 is deformed so as to expand.

By the way, as described above, in the conventional seat heater, the heating wire is fixed to the base material in which the plurality of ventilation holes are formed. In order to reduce the ventilation resistance of the seat heater, it is necessary to set a diameter of the ventilation hole to 10 mm or more. In this case, the heating wire cannot be fixed at the positions of the plurality of ventilation holes. For this reason, the heating wire must be arranged avoiding the plurality of ventilation holes, and the degree of freedom in layout of the heating wire is low. Since the heating wires are arranged so as to avoid the plurality of ventilation holes, there is a problem that the parts of the seated person that are desired to be warmed cannot be heated.

Further, the conventional seat heater manufacturing method described above includes a step of forming a base material, a step of forming a plurality of ventilation holes in the base material, and a cutting process of cutting the base material. In the step of forming the base material, for example, a nonwoven fabric as the base material is formed by needle punching or the like. In the step of forming a plurality of ventilation holes, a plurality of ventilation holes are formed by pressing the nonwoven fabric using a press machine. After that, the nonwoven fabric is wound into a roll. In the cutting step, the nonwoven fabric wound into a roll is cut into the outer shape of the seat heater by an NC cutting machine. Therefore, in the method of manufacturing a seat heater according to the above-described conventional technology, a pressing process is required to form a plurality of ventilation holes in the base material by press working, in addition to the cutting process of the base material. In order to reduce manufacturing costs, fewer steps are desirable.

On the other hand, according to the seat heater 5 of the present embodiment, the plurality of slits 53 are closed when the force for expanding the base material 51 is not applied to the base material 51. Therefore, the heating wire 52 can be fixed to the base material 51 even when the heating wire 52 is arranged over the plurality of slits 53 when manufacturing the seat heater 5. Even if the heating wire 52 is arranged over one slit 53 and the one slit 53 is divided into a plurality of slits 53, those slits 53 can be opened. Therefore, it is not necessary to arrange the heating wire 52 on the base material 51 while avoiding the plurality of slits 53. Therefore, according to the seat heater of the present embodiment, the heating wire 52 can be arranged with a high degree of freedom, and the heating wire 52 can be arranged so as to heat the desired part of the seated person.

Thus, the seat heater 5 of the present embodiment has a high degree of freedom in wiring the heating wire 52. As a result, according to the seat heater 5 of the present embodiment, the heating wire 52 includes a portion arranged to avoid the plurality of slits 53 and a portion arranged to pass over the plurality of slits 53. In other words, the plurality of slits 53 has the slits 53a arranged in the base material 51 at a position facing a part of the heating wire 52, and the slits 53b arranged in the base material 51 at a position not facing the heating wire 52.

Further, according to the seat heater 5 of the present embodiment, the formation of the plurality of slits 53 is possible by cutting the base material 51. Therefore, it is possible to form a plurality of slits 53 in the cutting step of cutting the base material wound into a roll into an outer shape of the seat heater 5. That is, the same cutting machine can be used to cut the base material wound into a roll into the outer shape of the seat heater 5 and to form the plurality of slits 53. Therefore, it is possible to eliminate the need for the press process that is required when manufacturing the conventional seat heater described above. The manufacturing process of the seat heater 5 can be simplified as compared with the manufacturing method of the conventional seat heater.

As described above, according to the seat heater 5 of the present embodiment, the ventilation resistance of the seat heater 5 can be reduced, and the degree of freedom in wiring of the heating wire 52 can be increased. In manufacturing the seat heater 5, it is possible to eliminate the need for press work for forming a plurality of ventilation holes in the base material 51 and simplify the manufacturing process of the seat heater 5.

Second Embodiment

In the present embodiment, the orientation of the plurality of slits 53 formed in the seat heater 5 is different from that in the first embodiment. Other configurations of the vehicle seat air-conditioning device 1 are the same as those of the first embodiment.

In the first embodiment, the plurality of slits 53 linearly extend in the longitudinal direction of the seat back 10 (that is, the vertical direction in the drawing). Therefore, each slit 53 opens when the base material 51 is pulled in a direction intersecting each slit 53. However, each slit 53 does not open when the base material 51 is pulled longitudinally.

Figure 5:
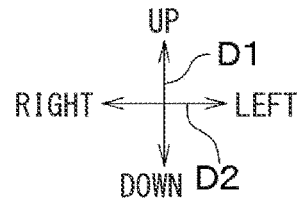
FIG. 5 is a diagram showing a portion of a seat heater and a portion of a seat pad according to a second embodiment.
Figure 5:
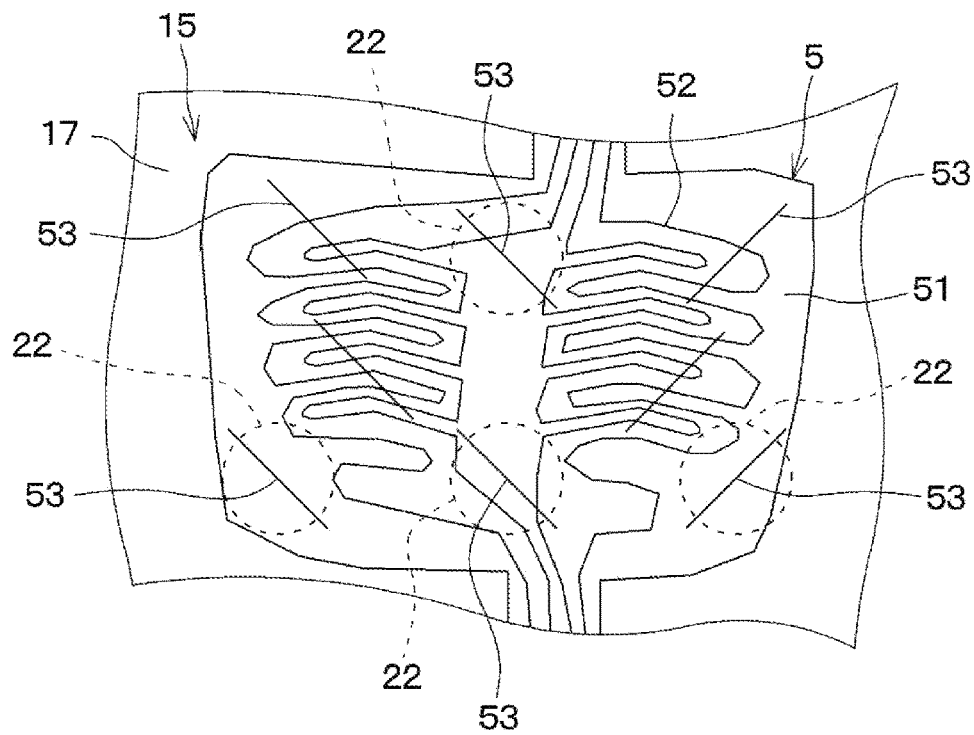

On the other hand, as shown in FIG. 5, in this embodiment, each of the plurality of slits 53 extends linearly in a direction oblique to each of the vertical direction and the horizontal direction. Therefore, each slit 53 can be opened regardless of whether the base material 51 is pulled in the vertical direction or the horizontal direction.

Third Embodiment

In the present embodiment, the shape of the plurality of slits 53 formed in the seat heater 5 is different from that in the first embodiment. Other configurations of the vehicle seat air-conditioning device 1 are the same as those of the first embodiment.

Figure 6:
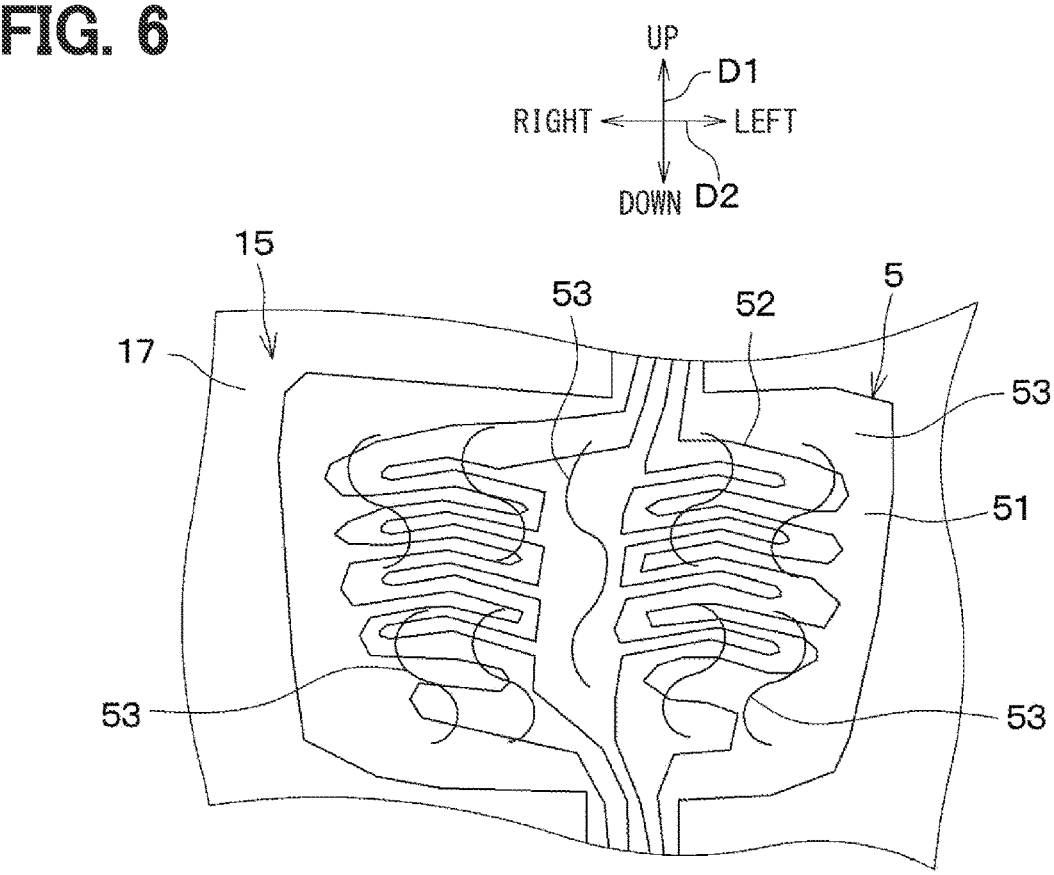
FIG. 6 is a diagram showing part of a seat heater and part of a seat pad according to a third embodiment.
Figure 7:
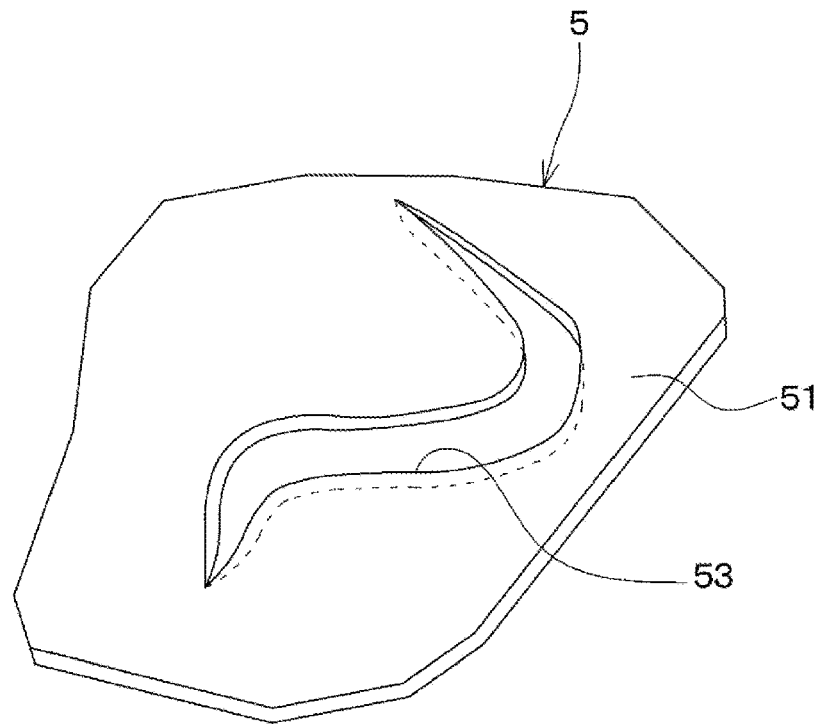
FIG. 7 is an enlarged view of an slit in an opened state and its periphery in the seat heater according to the third embodiment.

As shown in FIG. 6, in the present embodiment, each of the plurality of slits 53 extends in an S-shaped curve. Here, unlike the present embodiment, when each slit 53 extends linearly, each slit 53 does not open when the substrate 51 is pulled in a direction parallel to each slit 53. In contrast, according to the present embodiment, each slit 53 can be opened as shown in FIG. 7 regardless of which direction the base material 51 is pulled.

Furthermore, the slits 53 of the present embodiment are easier to open than when the slits 53 extend linearly. Therefore, even if the tensile stress applied to the base material 51 is small, the ventilation resistance of the seat heater 5 can be reduced by opening the slits 53.

Fourth Embodiment

Figure 8:
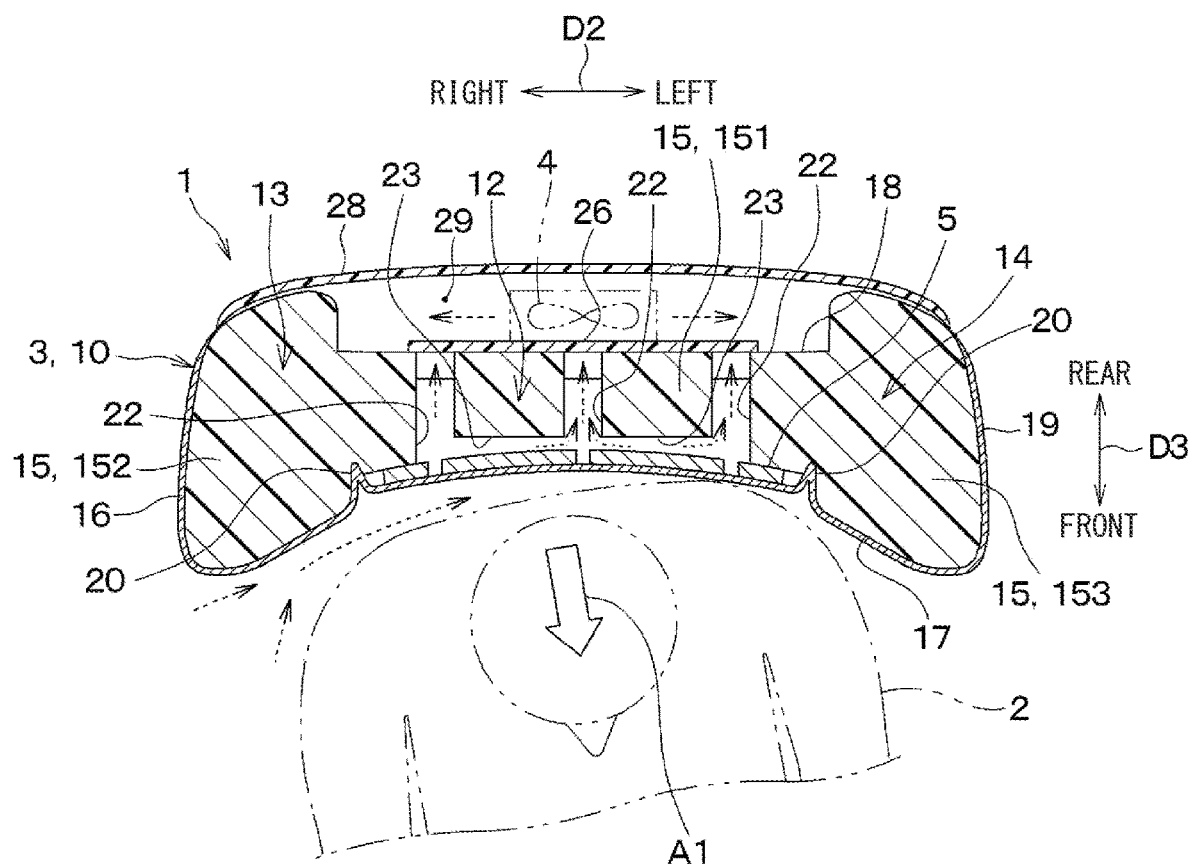
FIG. 8 is a cross-sectional view of a vehicle seat air-conditioning device of a fourth embodiment, corresponding to FIG. 2.
Figure 9:
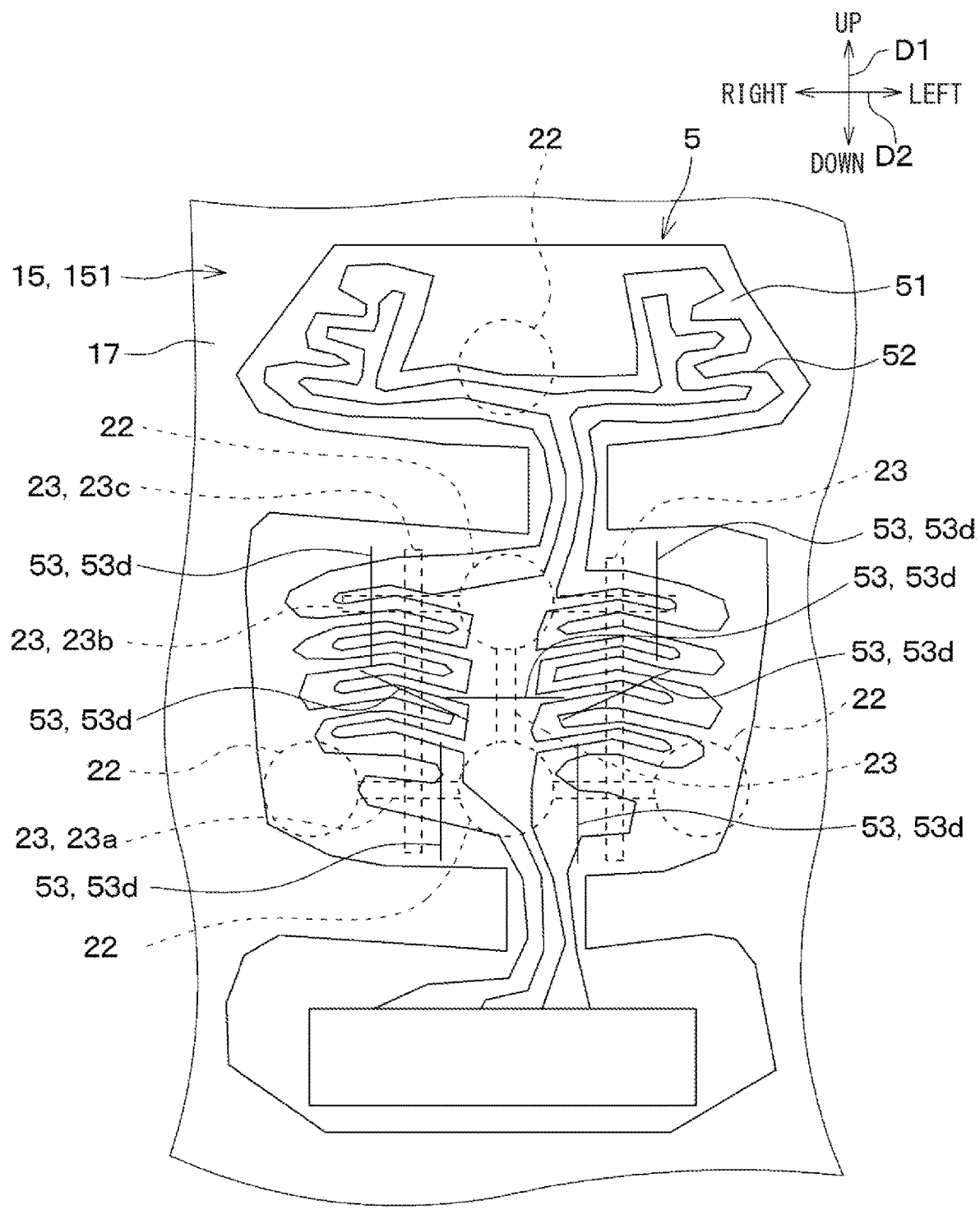
FIG. 9 is a front view of a seat heater and part of a seat pad of the fourth embodiment.

As shown in FIGS. 8 and 9, in the vehicle seat air-conditioning device 1 of the present embodiment, a plurality of surface grooves 23 connecting two or more of the plurality of ventilation holes 22 are linearly arranged on the surface 17 of the central pad portion 151 of the seat pad 15. The depth of the surface groove 23 is smaller than the thickness of the central pad portion 151, and is, for example, about 5 to 10 mm.

For example, the plurality of surface grooves 23 includes a first linear portion 23a that extends linearly to connect two ventilation holes 22, a second linear portion 23b that extends linearly from another ventilation hole 22, and a third linear portion 23c that extends linearly across both the first linear portion 23a and the second linear portion 23b. Only one surface groove 23 may be provided.

The plurality of slits 53 of the seat heater 5 include slits 53d arranged in the base material 51 at positions facing the surface grooves 23 in the thickness direction of the base material 51. The slits 53d are arranged to extend linearly so as to intersect the surface grooves 23 projected onto the base material 51 in the thickness direction of the base material 51. Other configurations of the vehicle seat air-conditioning device 1 of the present embodiment are the same as those of the vehicle seat air-conditioning device 1 of the first embodiment.

As shown in FIG. 8, when the seating posture of the passenger 2 changes from the normal posture to the oblique posture, air flows between the back of the passenger 2 and the seat back 10 as described in the first embodiment. At this time, in the present embodiment, the wind toward the ventilation holes 22 flows through the surface grooves 23. Therefore, more wind flows between the back of the passenger 2 and the seat back 10 than when the surface grooves 23 are not formed on the surface 17 of the central pad portion 151.

Further, according to the seat heater 5 of the present embodiment, the plurality of slits 53 include the slits 53d arranged at positions facing the surface grooves 23 of the seat pad 15. For this reason, seating pressure is applied to at least a part of the base material 51, and the slit 53d is opened, so that the airflow that passes through the surface groove 23 and is sucked into the ventilation hole 22 is likely to occur. By arranging the slit 53 in the seat pad 15 at a position facing the passage through which the wind flows, the ventilation resistance of the seat heater 5 can be reduced.

Furthermore, according to the seat heater 5 of the present embodiment, when the passenger 2 is seated on the seat 3, the slit 53d is easier to open than when the surface 17 of the seat pad 15 is not formed with the surface grooves 23. This has been confirmed through experiments conducted by the inventors of the present disclosure. When the surface 17 of the seat pad 15 is formed with the surface grooves 23, the surface 17 of the seat pad 15 tends to expand when receiving the seating pressure from the passenger 2. As the surface 17 of the seat pad 15 expands, the base material 51 of the seat heater 5 also expands. Therefore, it is considered that the slit 53d is easily opened.

In addition to the slits 53d arranged at positions facing the surface grooves 23 in the base material 51, the plurality of slits 53 may include slits 53c arranged at positions facing the ventilation holes 22 in the base material 51, as in the first embodiment.

The following describes the results of experiments conducted by the present inventors. The present inventors measured the suction air velocity when the seat heater 5 of Example 1 was used in the vehicle seat air-conditioning device shown in FIGS. 10 and 11. The suction air velocity is the speed of the air sucked into the covering 16.

Figure 10:
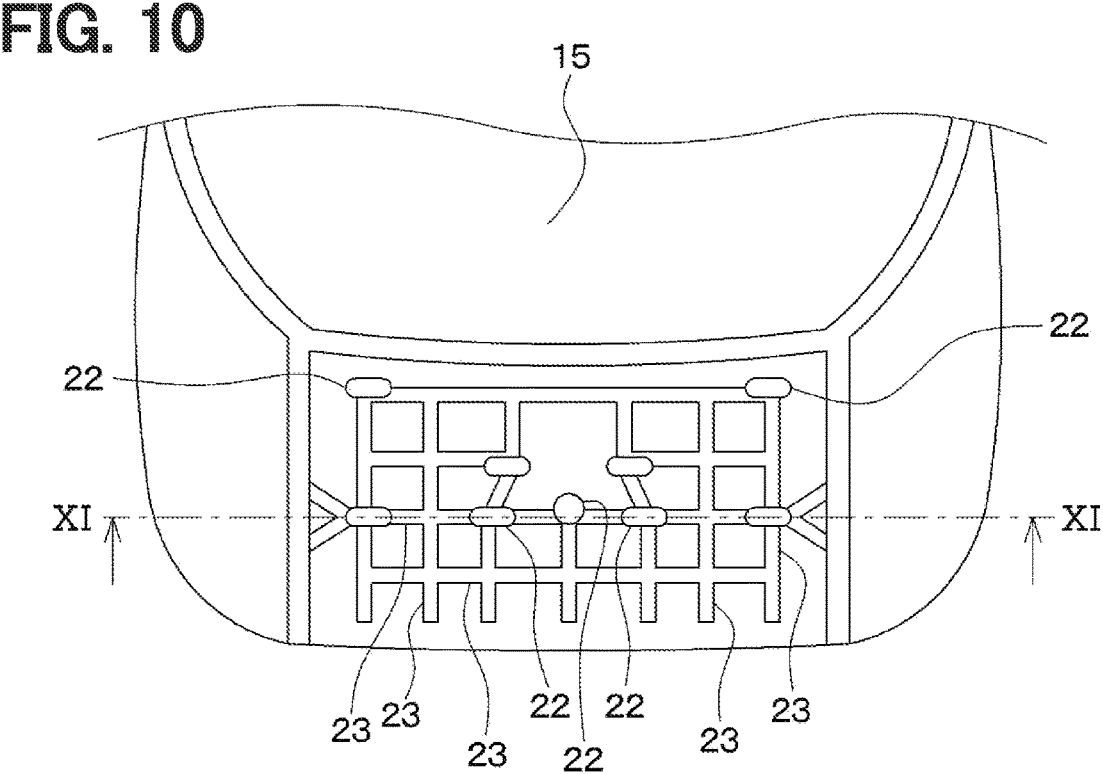
FIG. 10 is a plan view of a seat pad of a vehicle seat air-conditioning device used in a suction air velocity measurement test.
Figure 11:
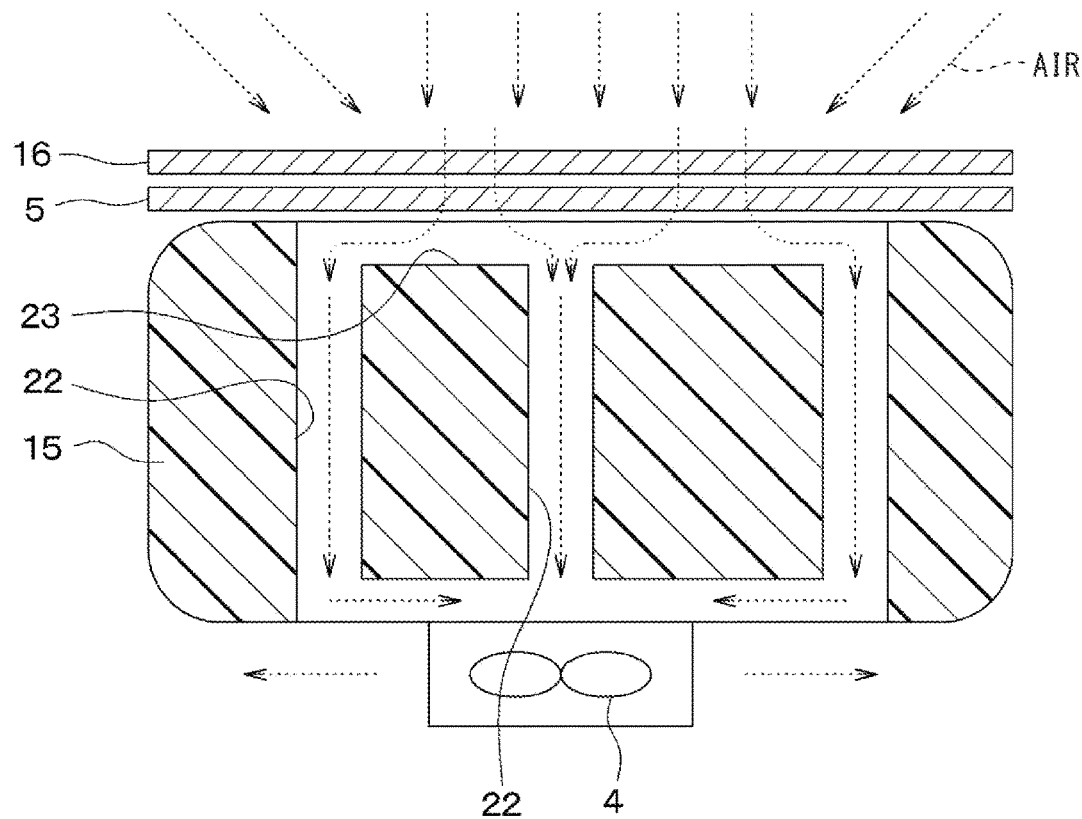
FIG. 11 is a cross-sectional view of the vehicle seat air-conditioning device used in the suction air velocity measurement test, and is a view corresponding to the cross-section taken along a line XI-XI in FIG. 10.

The vehicle seat air-conditioning device shown in FIGS. 10 and 11 corresponds to the vehicle seat air-conditioning device 1 of the second embodiment. The seat heater 5 is installed between the seat pad 15 and the covering 16. A plurality of ventilation holes 22 and a plurality of surface grooves 23 are formed in the seat pad 15. The plurality of surface grooves 23 includes a surface groove extending linearly in the horizontal direction so as to connect the surface grooves arranged in the horizontal direction, and a surface groove extending linearly in the vertical direction so as to connect the surface grooves arranged in the vertical direction. Further, the plurality of surface grooves 23 include a surface groove extending linearly to intersect with the surface grooves extending linearly to connect the surface grooves. A depth of the surface groove is 5 mm. By the operation of the blower 4, air passes through the covering 16 and the seat heater 5 in order, and flows through the plurality of surface grooves 23 and the plurality of ventilation holes 22.

The seat heater 5 of Example 1 includes a base material 51 and a heating wire 52, like the seat heaters 5 of the first and second embodiments. The base material 51 is made of nonwoven fabric. A plurality of slits 53 are formed in the base material 51. Similar to the seat heater 5 of the first embodiment, the plurality of slits 53 has the slits 53a arranged in the base material 51 at a position facing a part of the heating wire 52, and the slits 53b arranged in the base material 51 at a position not facing the heating wire 52. Also, the plurality of slits 53 includes the slit 53c arranged at a position facing one ventilation hole 22 in the base material 51. Moreover, like the seat heater 5 of the second embodiment, the plurality of slits 53 includes the slit 53d arranged at a position facing one surface groove 23.

In measuring the suction air velocity, the inventor measured the air velocity at five locations on the surface of the covering 16 using an anemometer, and calculated the average value of the measured air velocity values. When the passenger 2 or the like is present on the surface of the seat 3, the suction air velocity cannot be measured. For this reason, the suction air velocity was measured with no passenger or the like on the surface of the seat 3. Assuming that a seating pressure is applied to at least a part of the base material 51 due to the seating of the passenger 2 or a change in the seating posture, and the plurality of slits 53 are opened, the suction air velocity was measured while each slit 53 was kept open. The opening width of each slit 53 when the passenger 2 was actually seated on the seat 3 are 2 to 3 mm. Therefore, the inventor measured the suction air velocity while the base material 51 was stretched so that the maximum opening width of each slit 53 was 2 to 3 mm.

Figure 12:
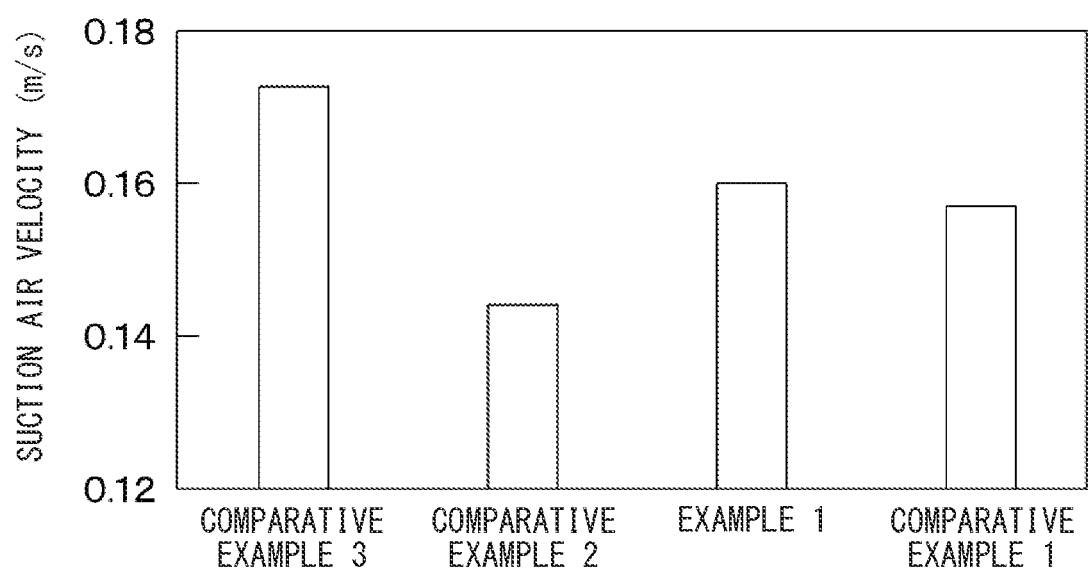
FIG. 12 are graphs showing measurement results of suction air velocity in Example 1 and Comparative Examples 1 to 3.

FIG. 12 shows the measurement results of the suction air velocity when the seat heater 5 of Example 1 is used. FIG. 12 shows the measurement results of the suction air velocity when the seat heaters of Comparative Examples 1 and 2 are used, and when the seat heater is not used as Comparative Example 3, in the vehicle seat air-conditioning device shown in FIGS. 10 and 11.

In the seat heater 5 of Comparative Example 1, as in the seat heater 5 of Example 1, the base material 51 is composed of a non-woven fabric. Unlike the seat heater 5 of Example 1, the base material 51 has a plurality of ventilation holes formed by punching in addition to the voids of the nonwoven fabric. Each ventilation hole is circular with a diameter of 3.5 mm.

In the seat heater 5 of Comparative Example 2, as in the seat heater 5 of Example 1, the base material 51 is composed of a non-woven fabric. Unlike the seat heaters 5 of Example 1 and Comparative Example 1, the base material 51 is not formed with slits and ventilation holes.

As shown in FIG. 12, the suction air velocity in Example 1 and Comparative Examples 1 and 2, in which the seat heater is used, is lower than that in Comparative Example 3, in which the seat heater is not used. The suction air velocity when the seat heaters of Example 1 and Comparative Example 1 are used is higher than the suction air velocity when the seat heater of Comparative Example 2 is used. The suction air speed of Example 1 was substantially the same as the suction air speed of Comparative Example 1. Although not shown, the present inventor measured the amount of air drawn into the covering 16, and found that the amount of air drawn in Example 1 was substantially the same as the amount of air drawn in Comparative Example 1. From these facts, according to the seat heater 5 in which a plurality of slits 53 are formed in the base material 51, it was confirmed that substantially the same airflow resistance reduction effect as that of a conventional seat heater in which a plurality of ventilation holes are formed in a base material can be obtained.

Fifth Embodiment

Figure 13:
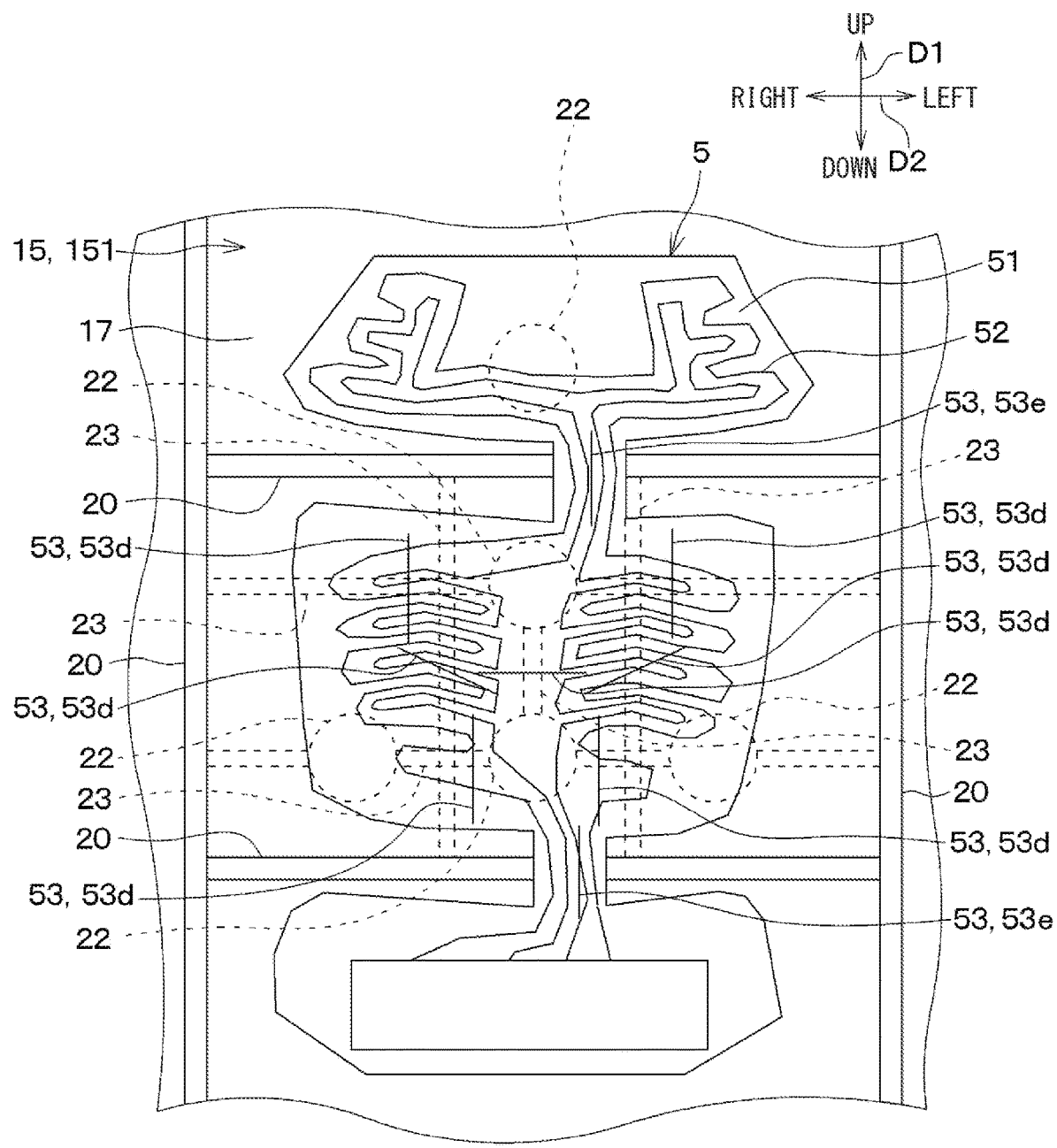
FIG. 13 is a front view of a seat heater and part of a seat pad of a fifth embodiment.

As shown in FIG. 13, a plurality of surface grooves 23 are linearly arranged on the surface 17 of the central pad portion 151 of the seat pad 15, as in the fourth embodiment. In this embodiment, the plurality of surface grooves 23 extend so as to connect the plurality of ventilation holes 22 and the plurality of hanging grooves 20. Therefore, when the air in the passenger compartment on the side of the seated passenger 2 is sucked into the plurality of ventilation holes 22 by the operation of the blower 4, an air flow is formed from the hanging groove 20 to the ventilation holes 22 through the surface grooves 23.

The seat heater 5 is arranged so as to cover the central pad portion 151 and the plurality of hanging grooves 20 of the seat pad 15. The plurality of slits 53 of the seat heater 5 are the slits 53d arranged in the base material 51 at positions facing the surface grooves 23 and a slit 53e arranged in the base material 51 at position facing at least one of the plurality of hanging grooves 20 in the thickness direction of the base material 51. The slit 53e extends linearly so as to intersect the hanging groove 20. Other configurations of the vehicle seat air-conditioning device 1 of the present embodiment are the same as those of the vehicle seat air-conditioning device 1 of the first embodiment.

According to this configuration, the slit 53e facing the hanging groove 20 is opened, so that the airflow that passes through the hanging groove 20 and the surface groove 23 and is sucked into the ventilation hole 22 is likely to occur. By arranging the slit 53 in the seat pad 15 at a position facing the passage through which the wind flows, the ventilation resistance of the seat heater 5 can be reduced.

Sixth Embodiment

Figure 14:
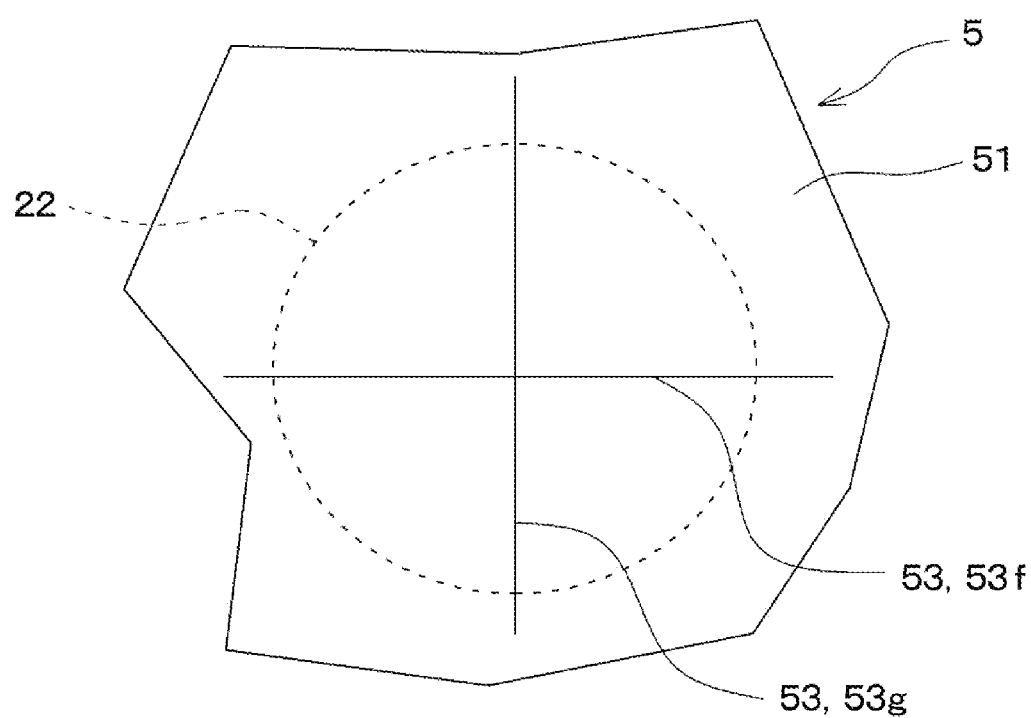
FIG. 14 is a front view of part of the seat heater of a sixth embodiment.

As shown in FIG. 14, in the present embodiment, the plurality of slits 53 has two orthogonal linear slits 53f, 53g formed in a region of the base material 51 facing any one of the plurality of ventilation holes 22 in the thickness direction of the base material 51. The two slits 53f and 53g are arranged at a position where one ventilation hole 22 is projected onto the base material 51 when the ventilation hole 22 is projected onto the base material 51 in the thickness direction of the base material 51. The two slits 53f and 53g are arranged so as to straddle the ventilation hole 22.

Other configurations of the vehicle seat air-conditioning device 1 of the present embodiment are the same as those of the first embodiment. Thus, similar advantages to those of the first embodiment can be obtained. Furthermore, according to the present embodiment, the two slits 53f and 53g are orthogonal within the area facing one ventilation hole 22. Therefore, compared to the case where only one slit 53 is arranged or the case where two non-intersecting slits 53 are arranged in the area facing one ventilation hole 22, the restraining force becomes smaller, and the two slits 53*f* and 53*g* are easily opened. Thereby, the two slits 53*f* and 53*g* can be opened by the ventilation of the ventilation holes 22 not only when the seating pressure is applied to the base material 51 when the passenger 2 is seated, but also when the seating pressure is not applied. Therefore, the ventilation resistance of the seat heater 5 can be reduced even when the seating pressure is not applied.

In addition, in the present embodiment, an intersection of the two slits 53*f* and 53*g* is positioned at the center of the area facing one ventilation hole 22. However, the intersection of the two slits 53*f* and 53*g* may be separated from the center. Also, in the present embodiment, the angle at which the two slits 53*f* and 53*g* intersect is 90 degrees. However, the angle at which the two slits 53*f* and 53*g* intersect may be an angle other than 90 degrees. Moreover, in the present embodiment, the two slits 53*f* and 53*g* extend linearly. However, the two slits 53*f* and 53*g* may not extend linearly, but may extend curvedly. Also, in the present embodiment, two slits 53 intersect in the area facing one ventilation hole 22, but may be three or more. Even in these cases, the same effects as in the present embodiment can be obtained.

Other Embodiments (1) In the third embodiment, all of the plurality of slits 53 extend in an S-shaped curve, but only part of the plurality of slits 53 may extend in an S-shaped curve. In short, at least one of the plurality of slits 53 should extend in an S-shaped curve. In this case, the same effects as in the third embodiment are obtained.

(2) In each of the above-described embodiments, the plurality of ventilation holes 22 suck air from the space on the passenger side by the operation of the blower 4. However, the plurality of ventilation holes 22 may blow air into the space on the passenger side by the operation of the blower 4.

(3) In each of the above embodiments, the seat heater 5 is applied to the vehicle seat air-conditioning device 1. However, the seat heater 5 may be applied to the seat air-conditioning devices other than those for vehicles.

(4) The present disclosure is not limited to the foregoing description of the embodiments and can be modified. The present disclosure may also be varied in many ways. Such variations are not to be regarded as departure from the disclosure, and all such modifications are intended to be included within the scope of the disclosure. The above-described embodiments are not independent of each other, and can be appropriately combined together except when the combination is obviously impossible. For example, the third embodiment can be combined with the first, fourth to sixth embodiments. At least one of the slits 53*a* to 53*g* described in the first, fourth to sixth embodiments may extend in an S-shaped curve.

(5) The constituent element(s) of each of the above embodiments is/are not necessarily essential unless it is specifically stated that the constituent element(s) is/are essential in the above embodiment, or unless the constituent element(s) is/are obviously essential in principle. A quantity, a value, an amount, a range, or the like referred to in the description of the embodiments described above is not necessarily limited to such a specific value, amount, range or the like unless it is specifically described as essential or understood as being essential in principle. Further, in each of the embodiments described above, when referring to the material, shape, positional relationship, and the like of the components and the like, except in the case where the components are specifically specified, and in the case where the components are fundamentally limited to a specific material, shape, positional relationship, and the like, the components are not limited to the material, shape, positional relationship, and the like.

What is claimed is:

1. A seat heater installed between a seat pad that is a member supporting a load from a seated person sitting on a seat and has a plurality of ventilation holes through which air generated by a blower flows being formed on a surface on a side of the seated person and a covering that covers a surface of the seat pad and has breathability, the seat heater comprising:
   a thin plate-like base material having air-permeable voids; and
   a heating wire fixed to the base material, wherein
   a plurality of slits separate from the voids are formed in the base material, and
   the slit closes when no tensile stress is applied to the base material, and opens when a load is applied from a seated person to at least a portion of the base material.

2. The seat heater according to claim 1, wherein
   the plurality of slits includes a first slit arranged in the base material at a position facing a part of the heating wire in a thickness direction of the base material.

3. The seat heater according to claim 1, wherein
   the plurality of slits includes a second slit arranged in the base material at a position not facing the heating wire in a thickness direction of the base material.

4. The seat heater according to claim 1, wherein
   the plurality of slits includes a third slit arranged in the base material at a position facing any one of the plurality of ventilation holes in a thickness direction of the base material.

5. The seat heater according to claim 1, wherein
   one or more surface grooves connecting two or more of the plurality of ventilation holes are linearly arranged on a surface of the seat pad, and
   the plurality of slits includes a fourth slit arranged at a position facing any one of the one or more surface grooves in a thickness direction of the base material.

6. The seat heater according to claim 1, wherein
   the plurality of slits includes two slits that intersect within a region of the base material facing any one of the plurality of ventilation holes in a thickness direction of the base material.

7. The seat heater according to claim 1, wherein
   at least one of the plurality of slits extends in an S-shaped curve.

8. A seat air-conditioning device, comprising:
   a blower for generating air;
   a seat pad that is a member constituting a seat and supporting a load from a seated person sitting on the seat and has a plurality of ventilation holes through which air generated by the blower flows being formed on a surface on a side of the seated person;
   a covering that constitutes the seat, covers the surface of the seat pad, and has breathability, and
   a thin plate-shaped seat heater installed between the seat pad and the covering, wherein
   the seat heater has a thin plate-like base material having voids through which air passes and a heating wire fixed to the base material,
   a plurality of slits separate from the voids are formed in the base material, and the slit closes when no tensile stress is applied to the base material, and opens when a load is applied from a seated person to at least a portion of the base material.

9. The seat air-conditioning device according to claim 8, wherein
the plurality of slits includes a third slit arranged in the base material at a position facing any one of the plurality of ventilation holes in a thickness direction of the base material.

10. The seat air-conditioning device according to claim 8, wherein
one or more surface grooves connecting two or more of the plurality of ventilation holes are linearly arranged on a surface of the seat pad, and
the plurality of slits includes a fourth slit arranged at a position facing any one of the one or more surface grooves in a thickness direction of the base material.

11. The seat air-conditioning device according to claim 8, wherein
the plurality of slits includes two slits that intersect within a region of the base material facing any one of the plurality of ventilation holes in a thickness direction of the base material.

* * * * *